United States Patent
Whitmyer, Jr.

(10) Patent No.: US 12,222,204 B2
(45) Date of Patent: Feb. 11, 2025

(54) SMARTPHONE RACING SAILBOAT INSTRUMENT AND CROWDSOURCED RACE TRACKING SYSTEM

(71) Applicant: Wesley W. Whitmyer, Jr., Stamford, CT (US)

(72) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 194 days.

(21) Appl. No.: 17/178,882

(22) Filed: Feb. 18, 2021

(65) Prior Publication Data

US 2021/0199441 A1  Jul. 1, 2021

Related U.S. Application Data

(63) Continuation of application No. 15/782,486, filed on Oct. 12, 2017, now Pat. No. 10,937,252.

(51) Int. Cl.
G01C 21/20  (2006.01)
B63B 79/00  (2020.01)
B63J 99/00  (2009.01)
G07C 1/24  (2006.01)

(52) U.S. Cl.
CPC ............ *G01C 21/203* (2013.01); *B63J 99/00* (2013.01); *G07C 1/24* (2013.01); *B63B 79/00* (2020.01)

(58) Field of Classification Search
CPC ................................ G01C 21/203; G07C 1/24

USPC ........ 342/352, 357.57; 701/482, 31.5; 463/6
See application file for complete search history.

(56) References Cited

U.S. PATENT DOCUMENTS

| | | | | |
|---|---|---|---|---|
| 5,731,788 A * | 3/1998 | Reeds | ...................... | G01S 19/19 342/357.57 |
| 2011/0250937 A1* | 10/2011 | Hubbard | ............... | A61B 5/1112 463/6 |
| 2013/0054138 A1* | 2/2013 | Clark | ................... | G01C 21/203 701/482 |
| 2015/0254910 A1* | 9/2015 | Summers | ............. | G01C 21/203 701/31.5 |
| 2016/0370187 A1* | 12/2016 | Gatland | ............... | G01C 21/203 |
| 2017/0067993 A1* | 3/2017 | Crowell | .................... | G01S 5/22 |

OTHER PUBLICATIONS

US Office Action Issued: Apr. 2, 2020.

* cited by examiner

*Primary Examiner* — Bo Fan
(74) *Attorney, Agent, or Firm* — Whitmyer IP Group LLC

(57) ABSTRACT

A sailboat race tracking system includes a race computer and a sailboat computing device authenticated to the race computer. The sailboat computing device transmits position data as a function of time to the race computer. An event organizer computing device sets a race start time and transmits the race start time to the race computer. The race computer receives the position data as a function of time from multiple sailboat computing devices and syncs it according to the race start time. The race computer transmits the time-synced position data of the sailboat computing devices to the sailboat computing devices and spectator computing devices for display.

17 Claims, 14 Drawing Sheets

SMARTPHONE RACING SAILBOAT INSTRUMENT AND CROWDSOURCED RACE TRACKING SYSTEM

TECHNICAL FIELD

The present disclosure relates generally to a sailboat race tracking system, and more particularly to a sailboat race tracking system having aspects for improving the start of the race, aspects for crowdsourcing and processing data of the race, and aspects for sharing and displaying information on the race to improve the racing experience for competitors, organizers, and spectators.

BACKGROUND

Sailboat races are complicated events that pose unique challenges to all parties involved including organizers, competitors, and spectators. Communication between organizers and sailboats on the open water is far more difficult than over land, e.g. at the start of a track event. The distance between boats and the complicated logistics of the race make simple verbal instructions and report (even with the help of a radio or signal flags) an unsatisfactory method of communication. Thus, organizing the start of a race can be very challenging for event organizers.

Even a seemingly simple task like determining when a boat crosses the start line can be quite difficult for organizers due to the fact that they must determine the starting line between the two starting marks and maintain a proper angle to view the boats crossing the line while also keeping the start time in their field of view to register any violations. During this process, one boat might obstruct the organizer's view of another boat, making it difficult to identify who crossed the line when. The rocking of organizer's boat and possible weather conditions can further complicate this task. Thus, determining if there was a penalty and assigning a penalty to the correct boat can be a challenging aspect of conducting a sailboat race.

The challenges faced by sailboats are numerous. The sailors must do their best to obtain the necessary information from the event organizers so that they can at least attempt to be in the right place at the right time. Then they need to arrive at the start line just at the right time before the start of the race, and do so while reaching top speed right beforehand in order to get a strong start. The tasks being performed on the sailboat are numerous and complex, each having a marginal contribution to the boat's performance. There is a seemingly limitless amount of information that can be gathered and used to help improve the boat's strategy in the race and its odds of winning. For example, starting infractions often occur due to a boat being over the starting line before the race start time. The penalty for an infraction may be different depending on the starting system being used. So a boat needs to know the starting system, whether they were over the line, and what the penalty is as a result. If the boat needs to exonerate itself, not only does the boat need to know this, but the information is also relevant to the other boats since it may affect their race strategy. Similarly, tasks like determining the exact location of the starting line and keeping track of the current positions of other boats in the race are a constant challenge for the competitors and can be a big distraction from the art of navigating the sailboat while reading the wind.

Sailboat races can be confusing to spectators as well. The spectator needs to know the location of the start line and course marks and have accurate time synced data on the positions of the sailboats in order to know the current standings in the race. In addition, spectators want to know if there is a penalty, and which boat received the penalty, so that the standings in the race can reflect this information. Given the typically immense size of the course, it would be quite difficult to keep track of the race using camera footage alone. Thus, a system for tracking a sailboat race is needed where spectators can view race data so that they understand what is occurring in the race while it is happening.

Aspects of the present invention are directed to overcoming these and other problems.

SUMMARY

According to an aspect of the present invention, a sailboat race tracking system includes a race computer accessible via telecommunication network at least a portion of which is wireless, multiple sailboat computing devices authenticated to the race computer via sailboat identification and event, and an event organizer computing device for setting a time indicative of a race start for the event. The sailboat computing devices transmit position data as a function of time to the race computer. The event organizer computing device transmits the race start time to the race computer. The race computer receives the position data as a function of time from said plurality of sailboat computing devices and simultaneously transmits the position data of each of the plurality of sailboat computing devices to at least one of the plurality of sailboat computing devices and a plurality of spectator computing devices for display.

According to another aspect of the present invention, a sailboat race starting system includes a starting line extending from a first starting mark to a second starting mark along an ocean surface and a starting plane extending from the starting line in a direction orthogonal to the ocean surface. A detector for detecting when a boat pierces the starting plane is disposed on or near the first starting mark. A notification is produced when a boat pierces the starting plane. The system also includes an identifier for identifying the boat that pierced the starting plane, with the identifier producing an identification that is transmitted to a race computer.

According to another aspect of the present invention, a sailboat race tracking method for a plurality of user devices includes the steps of providing a user device running software for a sailboat race tracking system. Selecting via the user device user settings from the group consisting of racing sailboat, organizer, and spectator. Selecting or entering event and race settings. Collecting race data from the user device and storing it on a race computer. Processing the race data on the race computer. Transmitting the race data to one or more user devices for display.

In addition to, or as an alternative to, one or more of the features described above, further aspects of the present invention can include one or more of the following features, individually or in combination:

- The race computer time syncs the position data using the race start time;
- The event organizer computing device transmits a position of at least one starting mark for the race to the race computer;
- A position satellite transmits position data to at least one of the the event organizer computing device and the plurality of sailboat computing devices;

A race computer transmits the at least one starting mark position to at least one of the plurality of sailboat computing devices and the plurality of spectator computing devices for display;

A plurality of event organizer computing devices, where each transmits a position of at least one course mark for the race to the race computer; and the race computer transmits the at least one course mark position to at least one of the plurality of sailboat computing devices and the plurality of spectator computing devices for display;

The plurality of event organizer computing devices transmits a position of a first starting mark and a second starting mark to the race computer, the race computer determines a starting line for the race, and the race computer transmits the starting line to at least one of the plurality of sailboat computing devices and the plurality of spectator computing devices for display;

At least one of the plurality of event organizer computing devices receives an indication when any individual one of a plurality of racing sailboats is over the starting line before the race start time; and the at least one of the plurality of event organizer computing devices determines a race start penalty for the individual one of the plurality of racing sailboats that was over the starting line before the race start time;

The at least one of the plurality of event organizer computing devices transmits the race start penalty for the individual one of the plurality of racing sailboats to the race computer; and the race computer transmits the race start penalty to at least one of the plurality of sailboat computing devices and the plurality of spectator computing devices for display;

The race computer stores the position data in a database according to the race and event so that the race computer can access the position data at a later time for transmission to at least one of the plurality of sailboat computing devices and a plurality of spectator computing devices for display;

At least one of the plurality of event organizer computing devices transmits a starting system for each race of the event to the race computer; and the race computer transmits the starting system to at least one of the plurality of sailboat computing devices and the plurality of spectator computing devices;

Each of the plurality of sailboat computing devices indicates when each of the individual ones of the plurality of racing sailboats is over the starting line in contravention of the starting system;

Each of the plurality of sailboat computing devices indicates when after being over the starting line in contravention of the starting system, the racing sailboat has successfully restarted the race to at least partially exonerate itself;

The race computer calculates a distance to the starting line using the position data and the starting line; the race computer calculates a rate metric using the position data that is indicative of the rate of progress toward the starting line for a one of the plurality of racing sailboats; the race computer calculates an estimated time until arrival at the starting line using the rate metric and the distance to the starting line for a one of the plurality of racing sailboats; and the estimated time until arrival at the starting line and the race start time are transmitted to at least one of the plurality of sailboat computing devices and a plurality of spectator computing devices for display;

A receiver disposed on or near the second starting mark, the detector emits an at least one light ray propagating along the starting plane and directed toward the receiver; and the notification is produced upon the receiver not receiving the at least one light ray;

The identifier scans a machine-readable code of the boat to produce the identification;

The identifier reads an RFID tag of the boat to produce the identification;

The identifier reads an AIS transceiver of the boat to produce the identification;

The user device is a sailboat user device and the user settings are for a racing sailboat, the method also includes the steps of transmitting race data from sensors in communication with the sailboat user device to the race computer indicating position and time, time syncing the race data pertaining to position and time on the race computer; and transmitting the time synced position and time data to one or more user devices for display;

The user device is an organizer boat user device and the user settings are for an organizer, the method further comprising the steps of: transmitting race data from the organizer boat user device to the race computer, the race data including one or more of race and course details, virtual flags and signals, starting mark positions, start system, start time, course mark positions, start penalties, exonerated boats, and finishes, processing the data from the organizer boat user device on the race computer and transmitting it to one or more user devices for display;

The race computer calculates a start line from the starting mark positions and transmits it to one or more user devices for display;

The race computer calculates a distance to the start line and transmits it to one or more user devices for display;

The race data from the organizer boat user device includes the start time, and the start time is displayed on a sailboat user device with the distance to the start line and boat speed;

The race data from the organizer boat user device includes virtual flags and signals, and the virtual flags and signals indicate at least one of shortened course and race abandoned, which is displayed on a sailboat user device;

The race data from the organizer boat user device includes the start system, and the start system is displayed on a sailboat user device with at least one of the speed, heel, and heading of the boat;

The event organizer computing device is a smartphone.

These and other aspects of the present invention will become apparent in light of the drawings and detailed description provided below.

DETAILED DESCRIPTION

Figure 1:
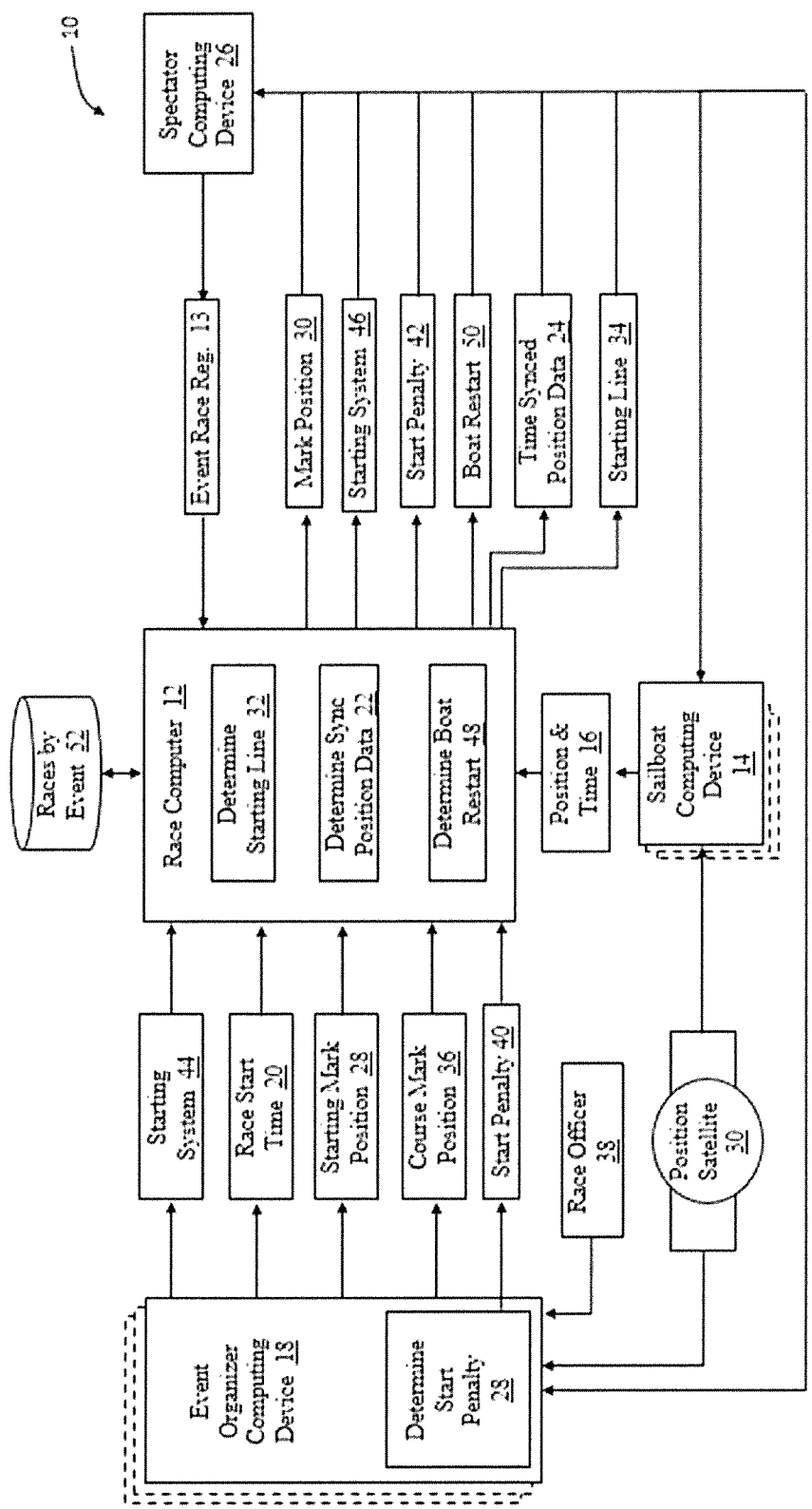
FIG. 1 is a schematic of a sailboat race tracking system according to the present disclosure.

Referring to FIG. 1, a sailboat race tracking system 10 includes a race computer 12 accessible via telecommunication network at least a portion of which is wireless. The tracking system 10 includes multiple sailboat computing devices 14 authenticated to the race computer 12 via sailboat identification and via event, e.g. with a login and password transmitted with an event race registration. Each of the sailboat computing devices 14 transmits their position as a function of time 16 to the race computer. The tracking system 10 includes an event organizer computing device, which sets a time indicative of a race start time 20 and transmits it to the race computer 12. The race computer 12 can then determine the sync position data 22, i.e. synchronize the position & time 16 sent by the sailboat computing devices 14 to the race start time so that the position data for each sailboat computing device is accurate relative to each other sailboat computing device, so that the current positions of the boats in the race are accurate relative to each other and the official time of the race. The time synced position data 24 is then transmitted back to the sailboat computing devices 14 for display by the competitors, and could also be transmitted to a spectator computing device 26 for individuals attending the event or watching it on a TV or via their smart phone; or sent to the event organizer computing device 18.

Referring to FIG. 1, the event organizer computing device 18 enters or verifies the starting mark position 28 and transmits this information to the race computer 12. A position satellite 30 sends the event organizer computing device 18 and/or sailboat computing device 14 their position as a function of time. The race computer 12 transmits the mark position 30 to the sailboat computing device 14 or spectator computing device 26 for display. In an ideal embodiment, the race computer 12 receives both starting mark positions 28 from two different event organizer computing devices 18, and then determines a starting line 32 for the race and transmits the starting line 34 to the computing devices 14, 26, 18 for display. A similar process occurs for the event organizer computing devices 18 to send the course mark position 36 to the race computer 12, and the race computer 12 sends the mark position 30 to the computing devices 14, 26, 18 for display. In other embodiments, the event organizer computing device 18 determines the starting line 32 and transmits it to the race computer 12, or directly to the computing devices 14, 26. In other embodiments, the sailboat computing device 14 calculated the starting line using the starting mark position. In other embodiments, the race computer 12, event organizer computing device 18, or sailboat computing device 14 calculate the race route or path, and transmit this to the computing devices 14, 26, 18 for display.

Referring to FIG. 1, the time synced position data 24 may be used together with visual inspections of the boats performed by the race officer 38, cameras situated around the course, or laser technology to determine when an infraction occurs. The event organizer computing device 18 receives an indication (from any of these multiple sources) of a start penalty 40 and transmits the start penalty 40 to the race computer 12, which then transmits the start penalty 42 to the computing devices 14, 26, 18 for display. The event organizer computing device 18 transmits the starting system 44 to the race computer 12, and the starting system is transmitted 46 to the computing devices 14, 26, 18 for display. In some sailing events, a boat must restart upon receiving a starting penalty. The race computer may reference the starting system 44 received from the event organizer computing device 18, as well as the start penalty 40, to determine a boat restart 48. The boat restart 50 is sent to the computing devices 14, 26, 18 for display, allowing the boat that received the penalty to know that they must restart. Upon a successful restart, the event organizer computing devices 18 indicate a successful restart and this information is sent to the race computer 12, where it is transmitted to the computing devices 14, 26, 18 so that they are aware that the boat has successfully restarted the race to at least partially exonerate itself. In other embodiments, the penalty process for any type of infraction received by a boat in the race can be entered by the event organizer computing device 18 and sent to the computing devices 26, 14, 18 either directly or via the race computer 12.

Referring to FIG. 1, a races by event database 52 stores the time-synced position data, as well as the event and race data, starting/course mark position, starting line position, penalty data, race results, footage or commentary on the race, or any other data considered relevant to one of skill in the art having the benefit of the present disclosure. The races by event database 52 stores this information so that the race computer 12 can access the data at a later time for transmission to the computing devices 26, 14, 18 for display, e.g. to show highlights of the race via short videos having digital animations of the boats alongside footage of the boats and racers and commentary explaining various aspects of the race like how the wind varied and what effect that had on various competing sailboats.

In an ideal embodiment, the event organizer computing device 18 and sailboat computing device are smart phones or tablets, and the spectator computing device 14 is either a smart phone, tablet, or television. The race computer 12 can also be a smart phone, tablet, or computer. All the computing devices are connected to and communicating via a cellular network/the internet. The race computer maintains a strong connection to the network and the other computer to keep the system running even when some of the other computing devices have a poor connection, which may be accomplished by keeping the race computer 12 close to or on land and stationary. The smartphone may be fixedly mountable to a racing sailboat and including software interfaced to internal sensors/receivers of the smartphone to display in customizable fashion on the smartphone screen racing parameters derived and/or calculated from the sensors/receivers, e.g. speed over ground, course over ground, heading, heel, pitch, and the like; and to track and store in the smartphone memory, on a transitory or semi-permanent basis, at least position of the sailboat (smartphone) as a function of time.

In other embodiments, the race computer 12 is an event organizer computing device 18. In other embodiments, the sailboat computing device 14 can serve as both an event organizer computing device 18 and/or the race computer 12. In yet other embodiments, the entire system can function via one or two computing devices serving the role of the race computer 12, event organizer computing device 18, and sailboat computing device 14 all in one, e.g. if two boats wanted to have a friendly race between each other using the system 10 to organize and track the race. In yet other embodiments, the entire system can function as software with or without real boats, e.g. in a video game. In other embodiments, position as a function of time is sent from the sailboat computing device 14 to the event organizer computing device 18 and/or spectator computing device 26 and/or other sailboat computing devices 14. In such a system the information may be rerouted to a different final destination, e.g. if one of a sailboat computing device 14 has poor service or connection to a network it may send its position as a function of time data to a nearby sailboat computing device 14 with a stronger connection, such that the data can be sent to the race computer 12 or other destination through that other sailboat computing device's 14 connection.

Figure 2:
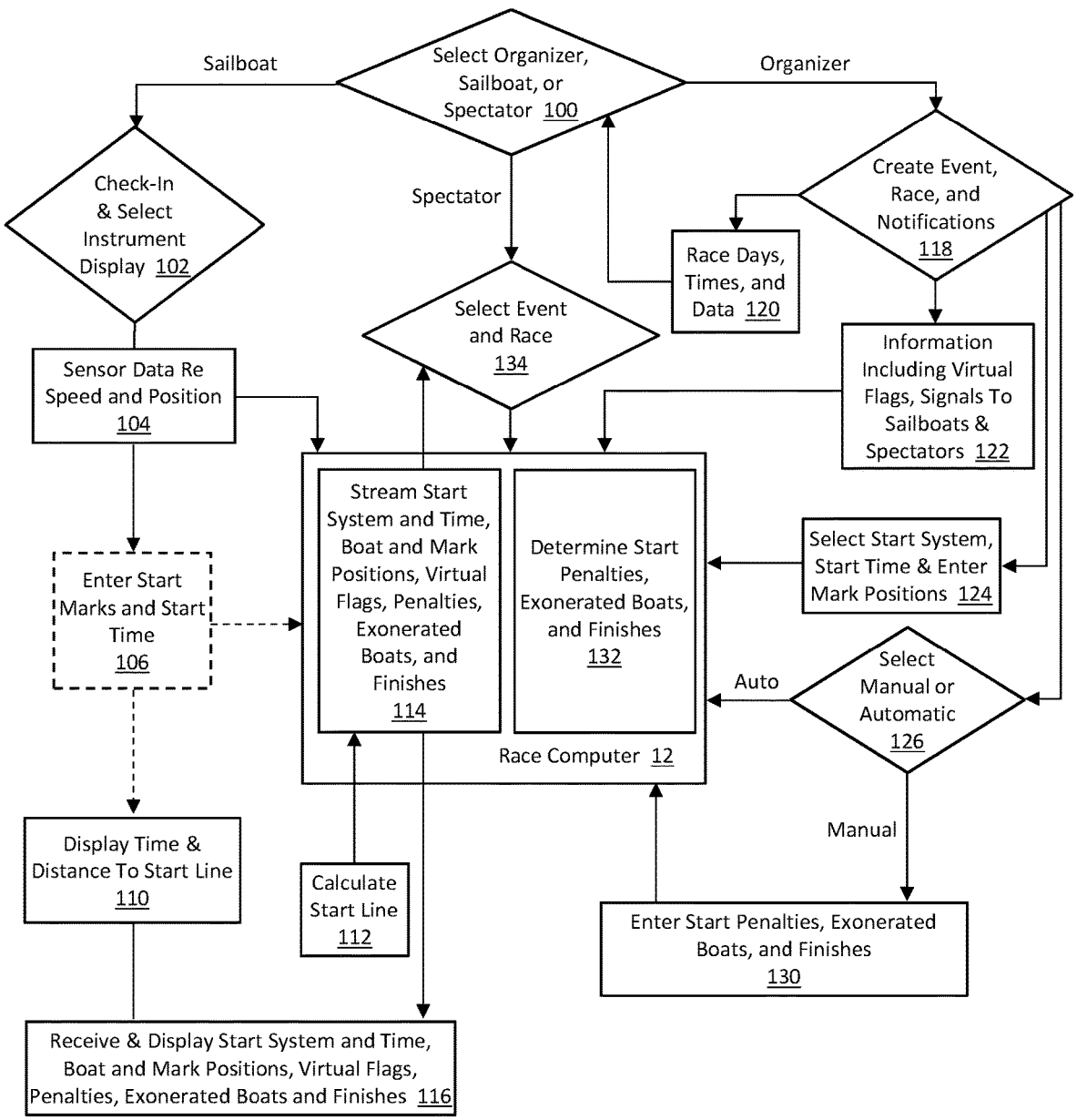
FIG. 2 is a combination of a flow chart and schematic of a sailboat race tracking method as shown in FIG. 1.
Figure 3:
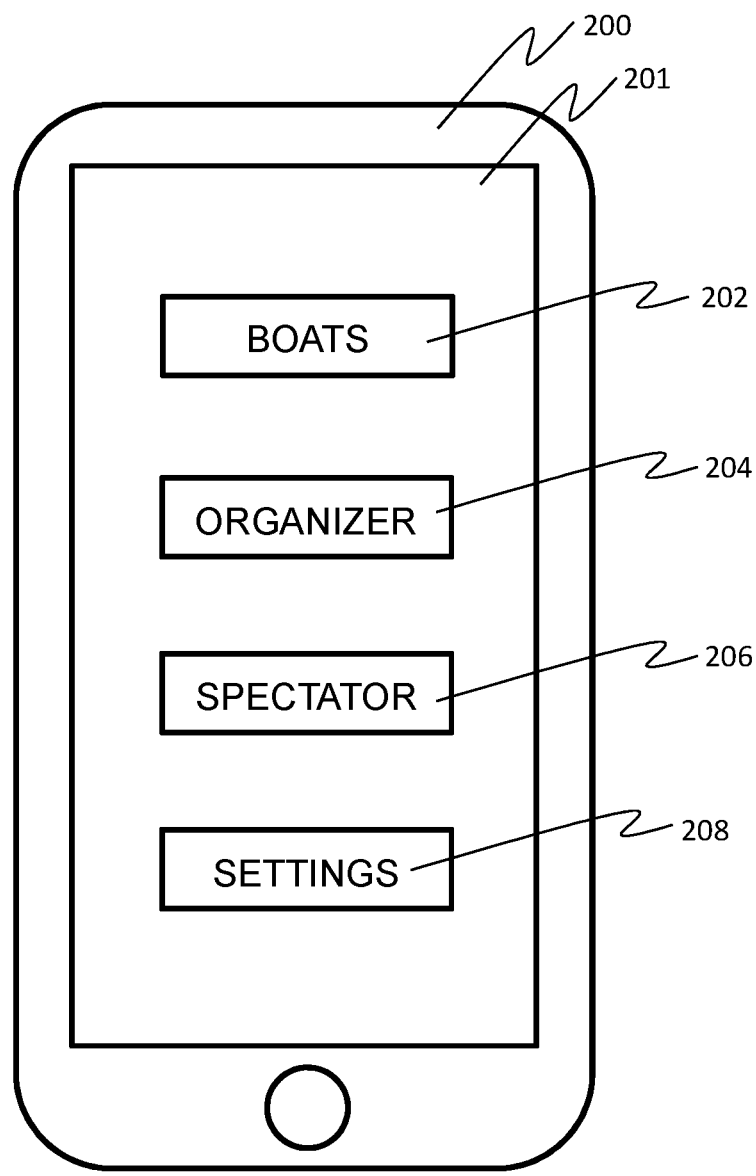
FIG. 3 is a user device showing user settings according to the system of FIG. 1.

Referring to FIG. 2, a sailboat race tracking system 10 is shown as a combination of a schematic and a flowchart. The system 10 involves a user device running software for a sailboat race tracking system. The user selects user settings 100 from the group consisting of organizer, sailboat, and spectator (an example of this selection is shown in FIG. 3). If the user selects sailboat in step 100, the user will check-in and select instrument display 102. The device displays sensor data for speed and position 104 and sends the information to the race computer 12. The user optionally enters the start marks and start time 106, which may optionally be sent to the race computer 12 or optionally gets processed locally and/or used in combination with information from the race computer 12 to display the time and distance to the start line 110. The start line is calculated 112 and entered into the race computer 12. The race computer 12 streams start system and start time, boat and mark positions, virtual flags, penalties, exonerated boats and finishes 114 to the sailboat, which receives and displays the start system and time, boat and mark positions, virtual flags, penalties, exonerated boats and finishes 116.

If the user selects event organizer in step 100, the user will create the event and the race and generate notifications 118. Race days, times, and data 120 are then used to help devices register for the appropriate race and event during step 100. During the race, the event organizer will enter information including virtual flags and signals to sailboats & spectators 122 regarding what is occurring in the race. The event organizer will also select the start system, race time, and starting/course mark positions 124, which are sent to the race computer 12. The event organizer may either conduct certain aspects of the system manually or automatically, which is selected by the event organizer in step 126. If done automatically, the race computer determines start penalties, exonerated boats, and finishes 132. If done manually, the event organizer enters start penalties, exonerated boats, and finishes; which are sent to the race computer 12.

If the user selects spectator in step 100, the user can then select the event and race 134 they would like to view. This information is sent to the race computer 12, and the race computer streams start system and start time, boat and mark positions, virtual flags, penalties, exonerated boats and finished 114 to the spectator. This may include video and audio clips, and information/charts detailing what is happening or has happened in the race.

Referring to FIG. 3, a user device 200 has a display 201 showing user selections for boats 202, organizer 204, spectator 206, or settings 208. The user device 200 is a smart phone running an application according to the system sailboat race tracing system 10 shown in FIG. 1.

Figure 4:
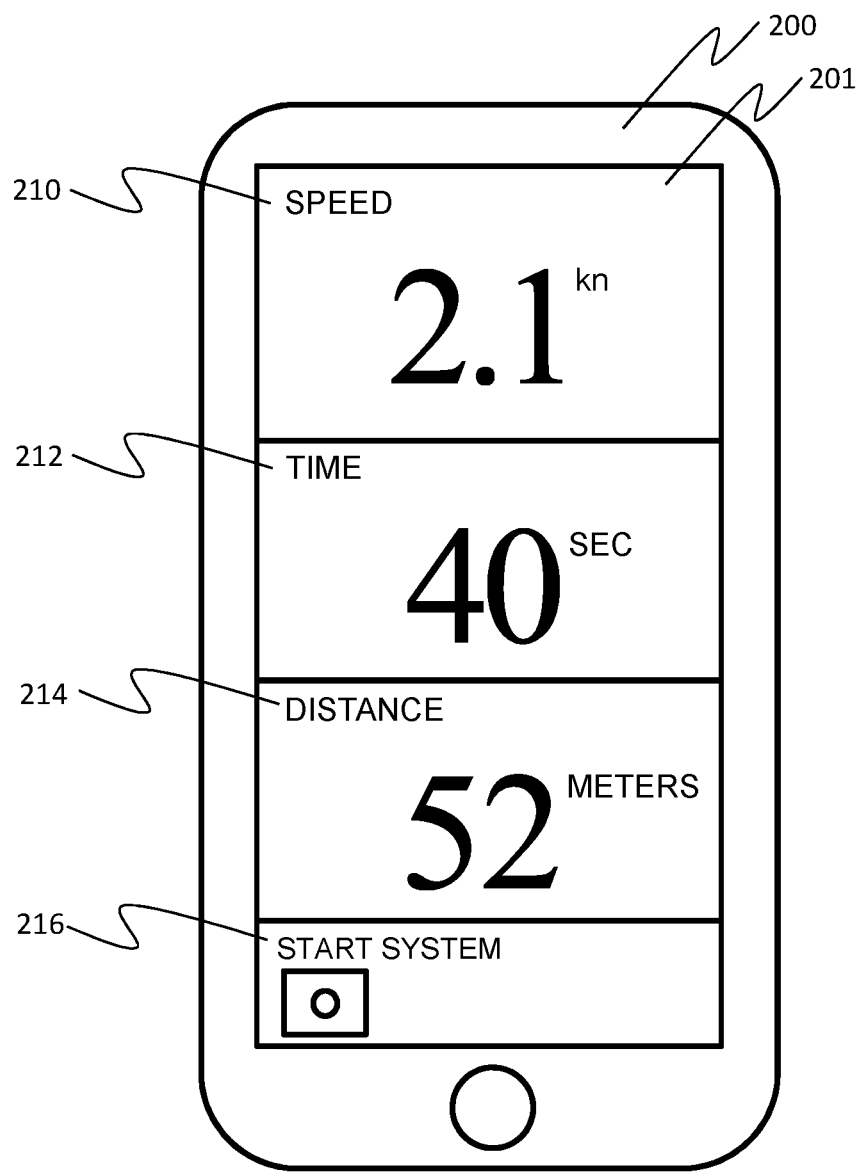
FIG. 4 is a user device showing race data according to the system of FIG. 1.

Referring to FIG. 4, a user device 200 has a display 201 showing the speed 210 of the boat in knots, the race start time 212 in seconds, and the distance to the start line 214. The start system 216 is shown via a display flag, in this case the display flag shown is the "I" flag.

Figure 5:
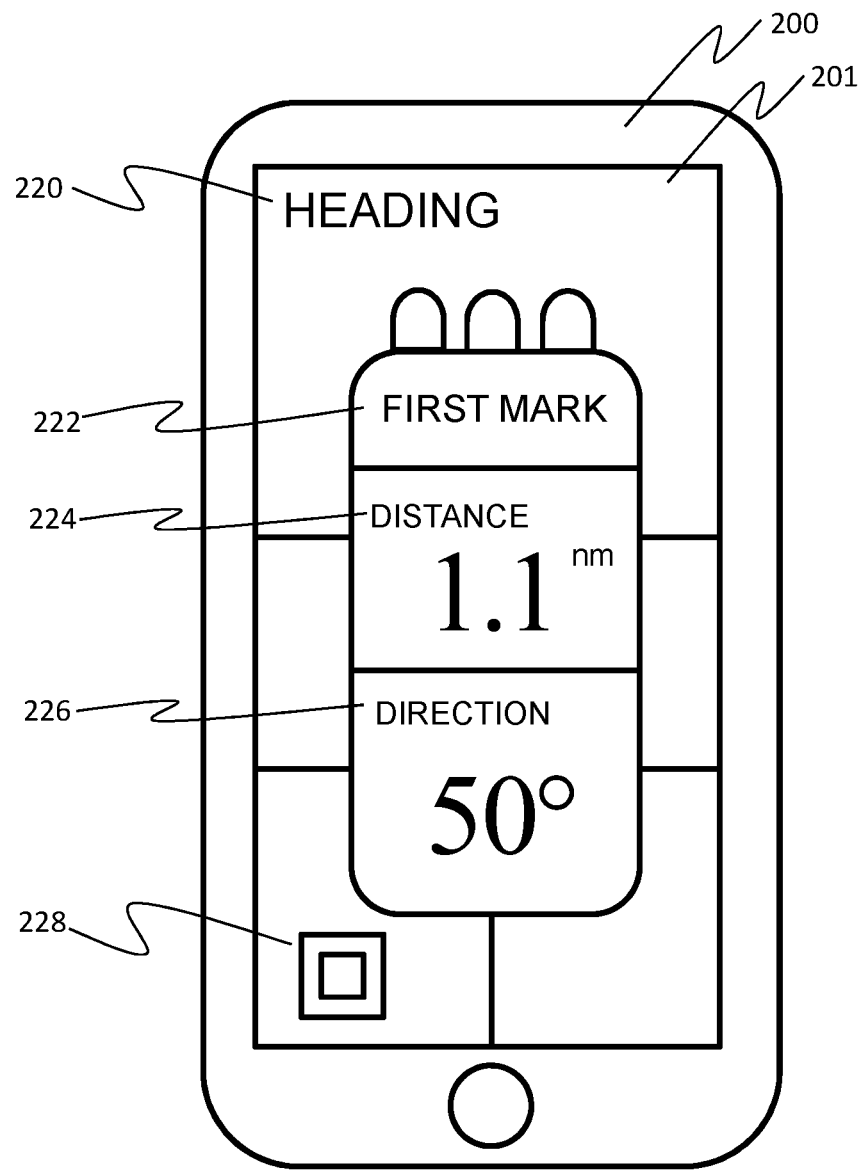
FIG. 5 is a user device showing race data according to the system of FIG. 1.

Referring to FIG. 5, a user device 200 has a display 201 showing the heading 220 for a destination 222 (here, the destination is displayed is the "First Mark"). The display 201 shows the distance 224 to the mark in meters, and the direction 226 of the mark in degrees. A signal flag 228 is shown on the display 201, the signal flag shown here is the "P" flag.

Figure 6:
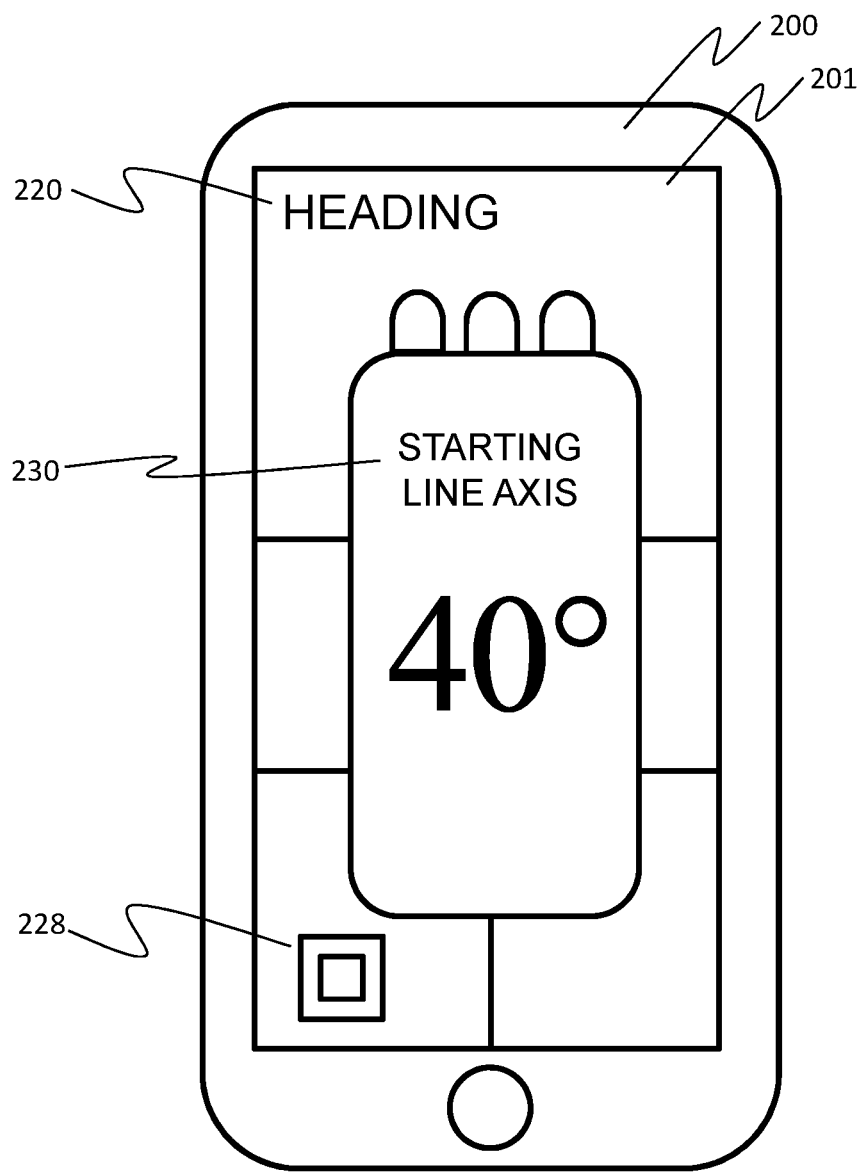
FIG. 6 is a user device showing race data according to the system of FIG. 1.

Referring to FIG. 6, a user device 200 has a display 201 showing the heading 220. The display 201 shows the starting line axis 230 in degrees, in this case the starting line is 40 degrees. A signal flag 228 is shown on the display 201, the signal flag shown here is the "P" flag.

Figure 7:
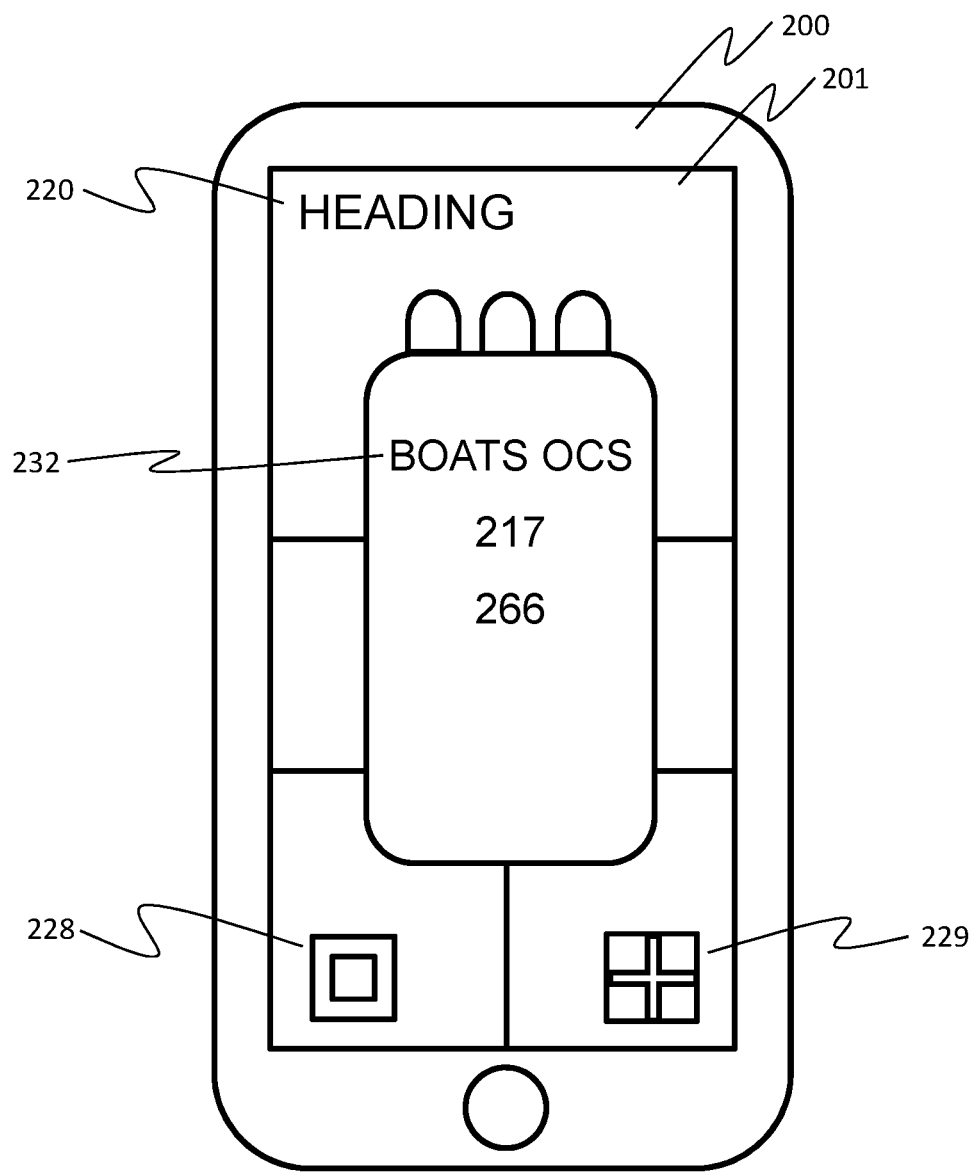
FIG. 7 is a user device showing race data according to the system of FIG. 1.

Referring to FIG. 7, a user device 200 has a display 201 showing the heading 220. The display 201 shows the Boats OCS 232, in this case "217" and "266" are shown. A left side signal flag 228 and a right side signal flag 229 are shown on the display 201. Here, the left signal flag 228 is the "P" flag, and the right signal flag 229 is the "X" flag.

Figure 8:
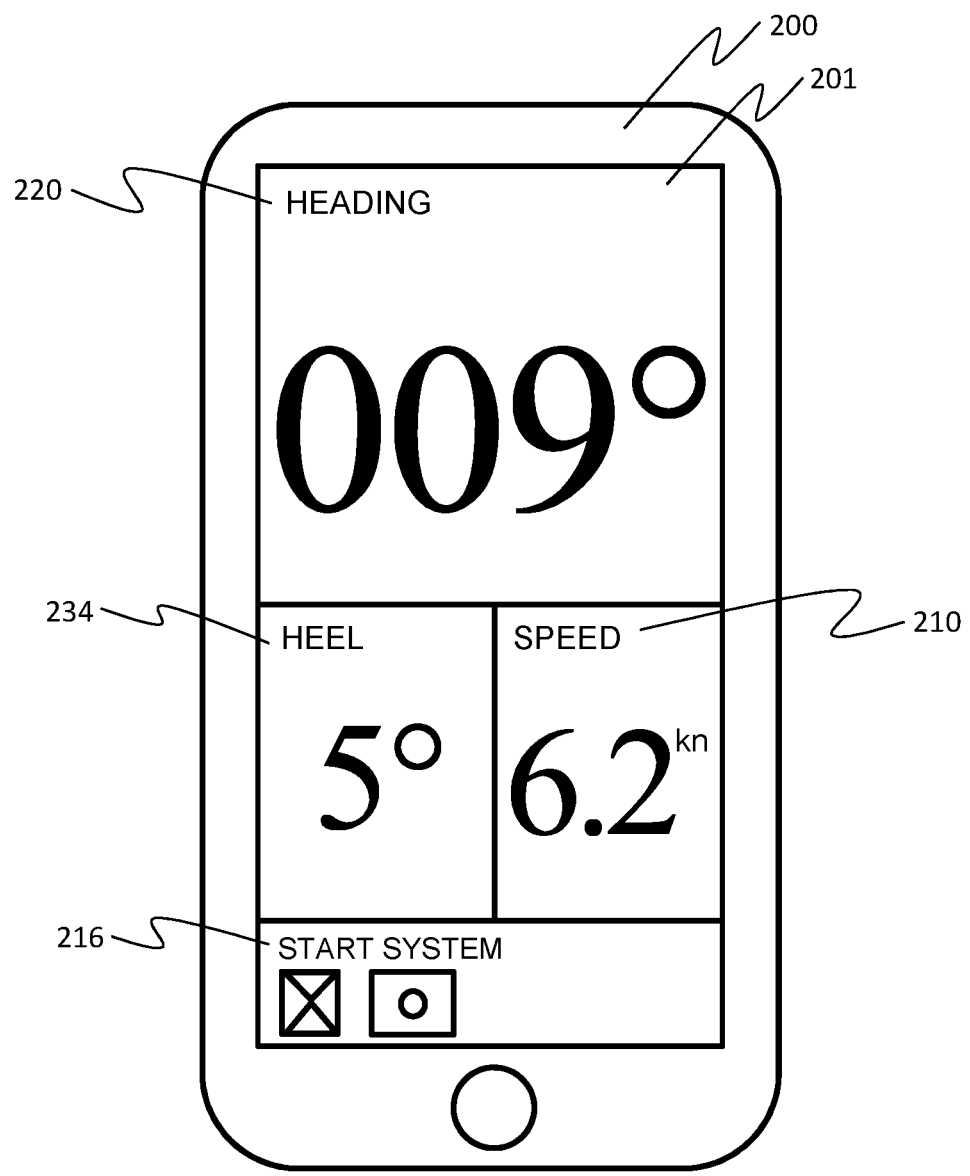
FIG. 8 is a user device showing race data according to the system of FIG. 1.

Referring to FIG. 8, a user device 200 has a display 201 showing the heading 220. The heading 220 of "009°" is shown. The heel 234 of "5°" is shown. The speed 210 of "6.2" knots is shown, and start system 216 is shown, in this case with the "Z" flag and "I" flag side by side.

Figure 9:
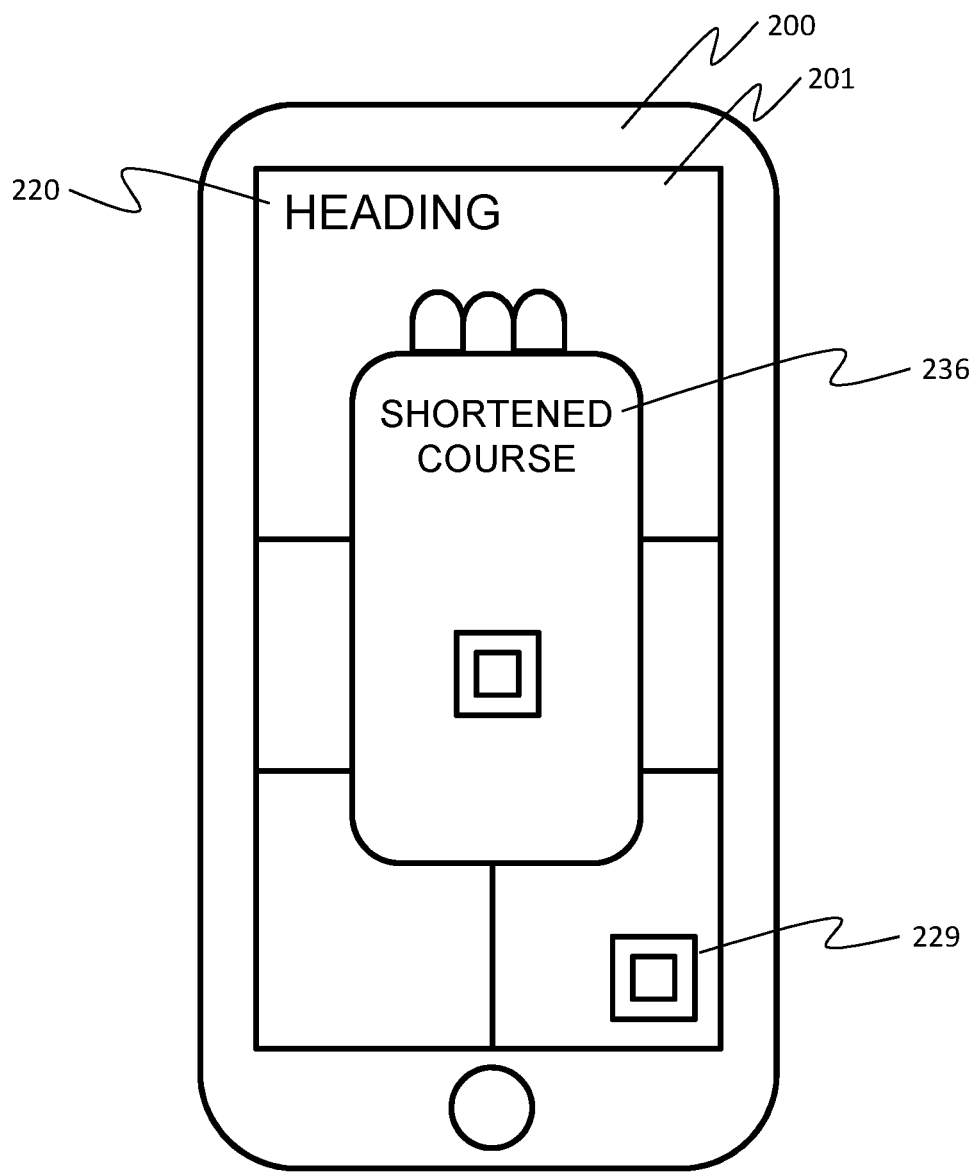
FIG. 9 is a user device showing race data according to the system of FIG. 1.

Referring to FIG. 9, a user device 200 has a display 201 showing the heading 220. The display 201 shows a shortened course 236 notification with a signal flag, in this case the "S" flag. A right side signal flag 229 is shown on the display 201, the right side signal flag shown here is the "S" flag.

Figure 10:
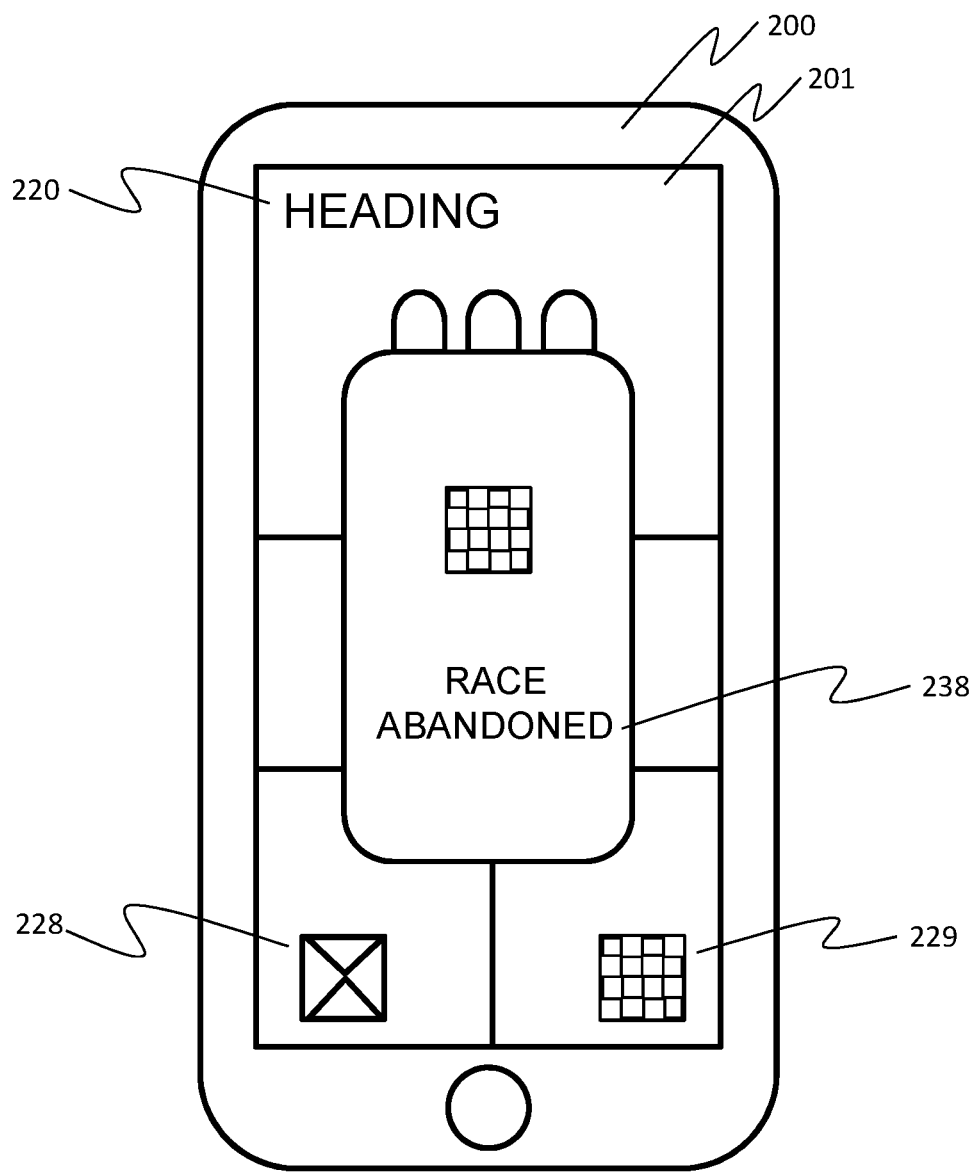
FIG. 10 is a user device showing race data according to the system of FIG. 1.

Referring to FIG. 10, a user device 200 has a display 201 showing the heading 220. The display 201 shows a Race Abandoned 238 notification with a signal flag, in this case the "N" flag. A left side signal flag 228 and a right side signal flag 229 are shown on the display 201. Here, the left signal flag 228 is the "Z" flag, and the right signal flag 229 is the "N" flag.

Figure 11:
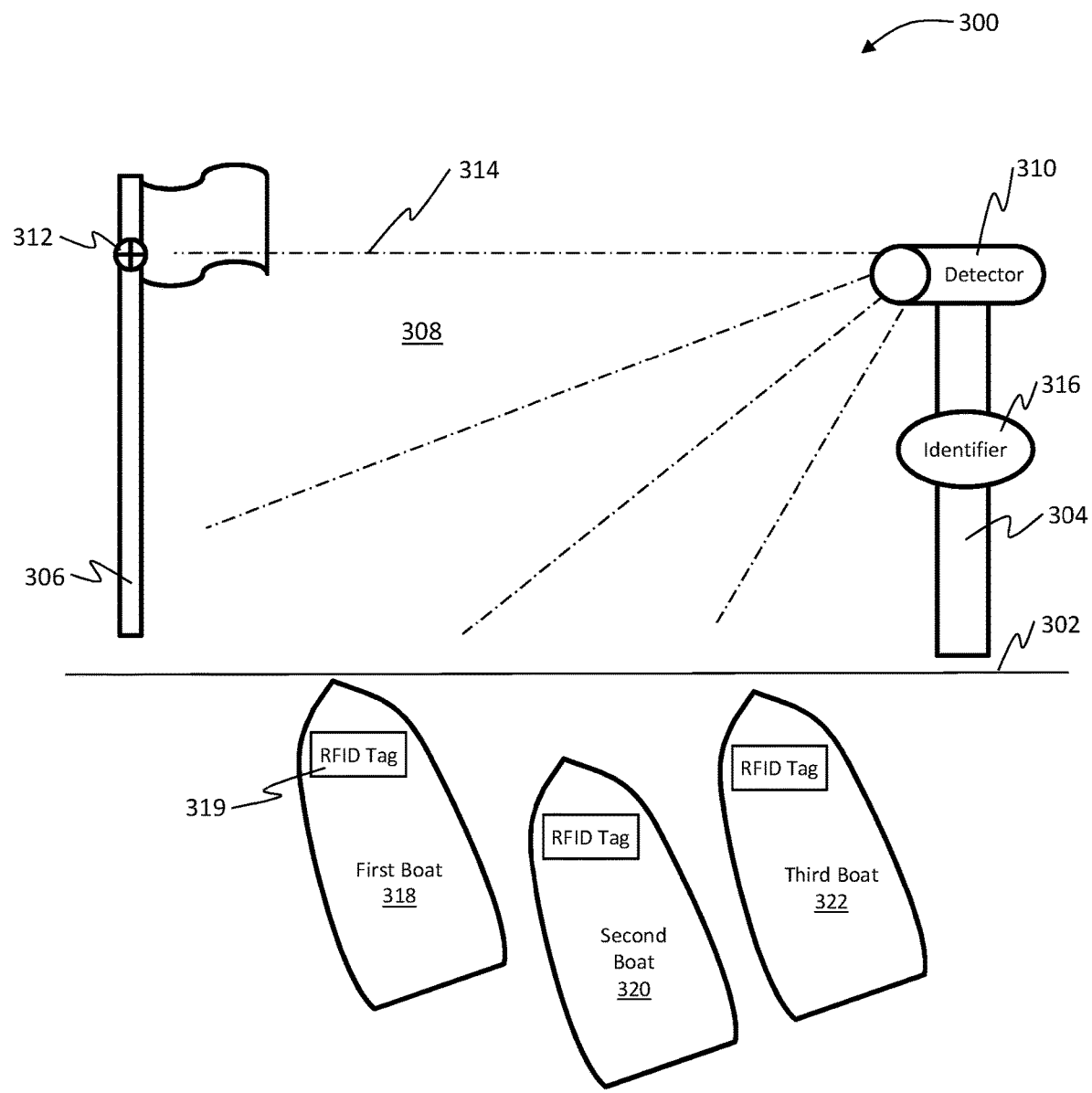
FIG. 11 is a schematic of a system for providing an aid to organizers for the start of a sailboat race.

Referring to FIG. 11, a sailboat race starting system 300 is shown. A starting line 302 extends from a first mark 304 to a second mark 306 along an ocean surface. A starting plane 308 extends from the starting line 302 in a direction orthogonal to the ocean surface. A detector 310 is disposed on the first mark 304 for detecting when a boat pierces the starting plane 308. A receiver 312 is disposed on the second mark 306. The detector 310 emits light rays 314 propagating along the starting plane 308 and directed toward the receiver 312. Once the receiver 312 receives the light ray 314 from the detector 310, communication is established between the two devices, such that as soon as an object obstructs communication between the two devices 310, 312, the system 300 detects that the starting plane 308 has been pierced or crossed by an object, e.g. a boat. A notification (not shown) is produced when the starting plane 308 is crossed, which, e.g. can be sent to the race computer 12 in the system of FIG. 1. An identifier 316 identifies the boat that crossed the starting line. For example, if the first boat 318 crosses the starting plane 308, the identifier 316 would send out an RF signal to the RFID tag 319 on the first boat 318 and determine its identity, and a notification would be sent to the race computer 12 so that it can be determined if the first boat crossed the plane before the start time of the race. The system 300 would continue to operate so that when the second boat 320 and third boat 322 crossed the starting plane 308, they also can be identified and their time of crossing is transmitted to the race computer 12 or similar functioning device.

In other embodiments, the identifier 316 and detector 310 may be the same device. In yet other embodiments, the identifier 316 can read a machine readable code such as a QR code printed on the boat in order to identify the boat. In yet other embodiments, the identifier 316 reads an AIS transceiver of the boat to produce the identification of the boat.

Figure 12:
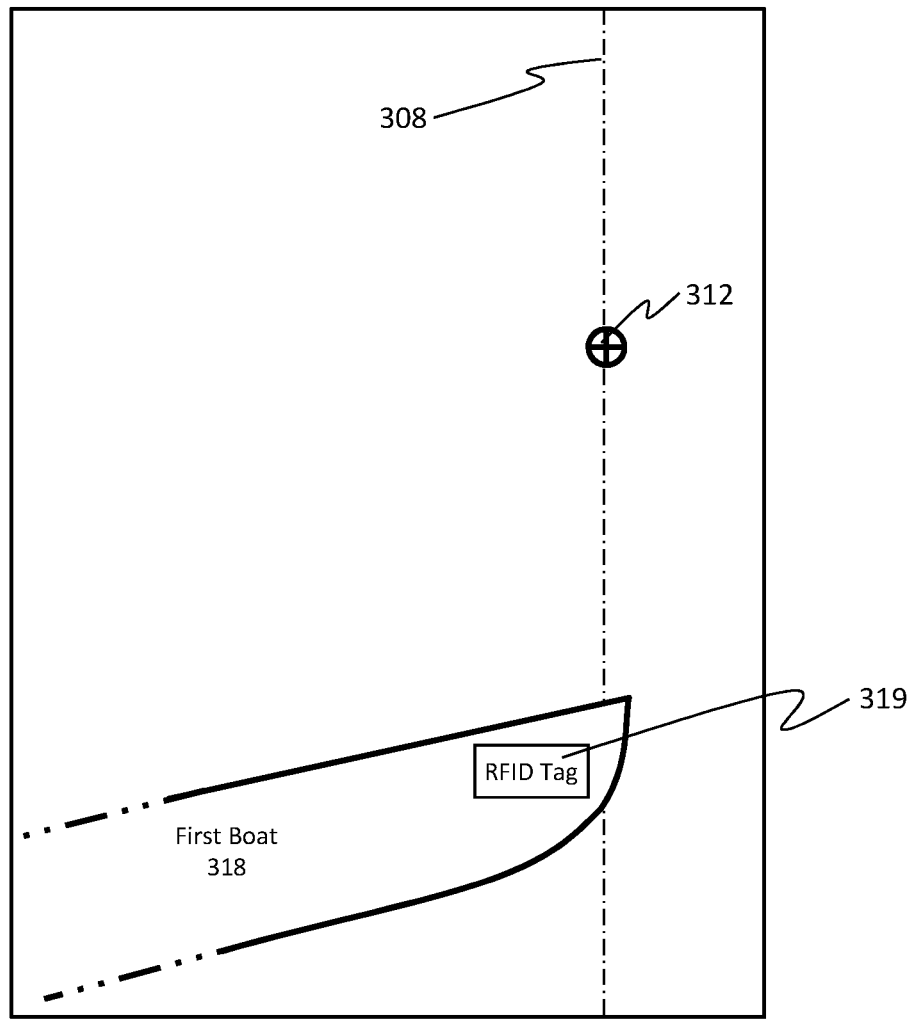
FIG. 12 is a plan view of the system of FIG. 11.

Referring to FIG. 12, the sailboat race starting system 300 is shown with the first boat 318 crossing the starting plane 308. The receiver 312 lies in the starting plane 308. As can be seen in the figure, the RFID can serve both to identify when the first boat 318 pierces the starting plane 308 and also to identify that it was the first boat 318. In similar embodiments, it may be necessary to choose the location of the detector 310 and receiver 312 or focus their scanning areas to function, and it may be beneficial to the accuracy and functioning of the system 300 to include additional RFID scanners or detectors.

Figure 13:
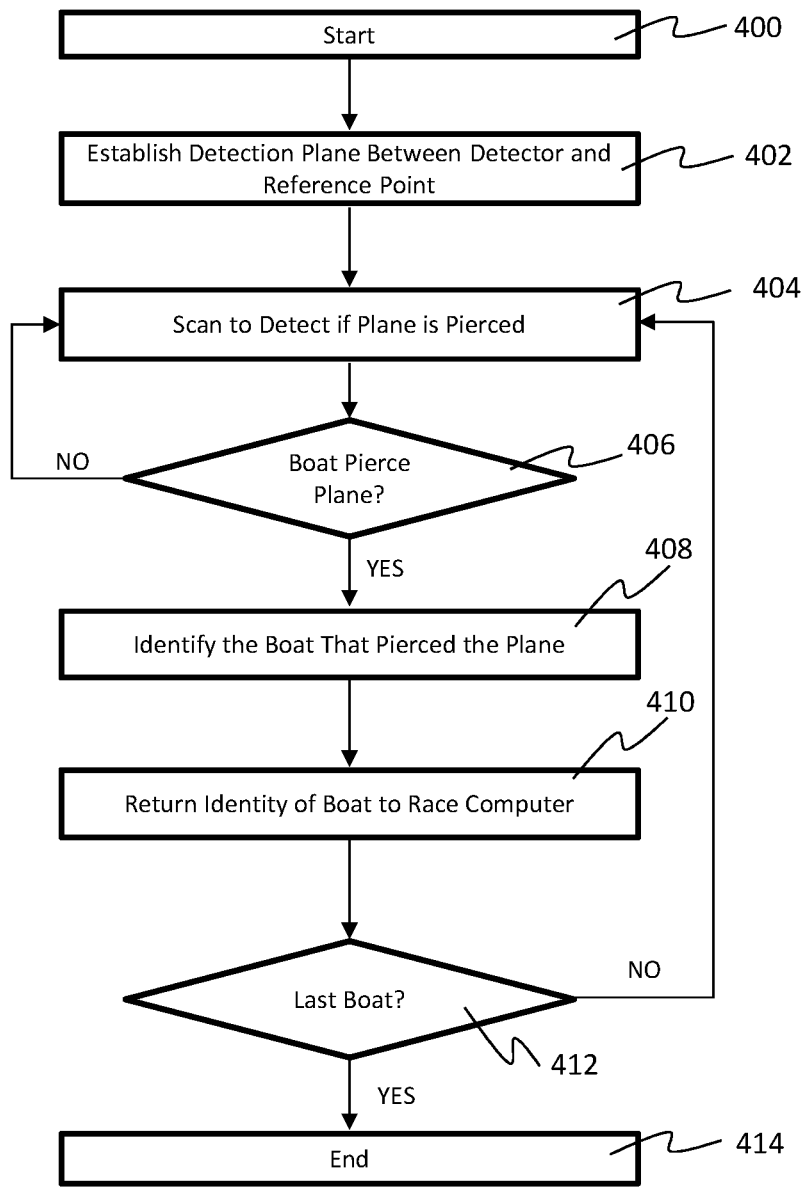
FIG. 13 is a flowchart of a method according to the system of FIG. 11.

Referring to FIG. 13, a method demonstrating how the system 300 functions is shown. The method starts 400 and the system establishes a detection plane between the detector and a reference point 402. The system scans to detect if the plane is pierced 404. The system determines if the boat pierces the plane 406. If a boat did not pierce the plane, then it continues to scan to detect if the plane is pierced 404. If it did pierce the plane, then the system identifies the boat that pierced the plane 408. The identity of the boat is returned to the race system 410. The system determines if this is the last boat in the race 412. If it is not the last boat in the race, the system continues to scan to detect if the plane is pierced 404. If it is the last boat, then the method ends 414.

Figure 14:
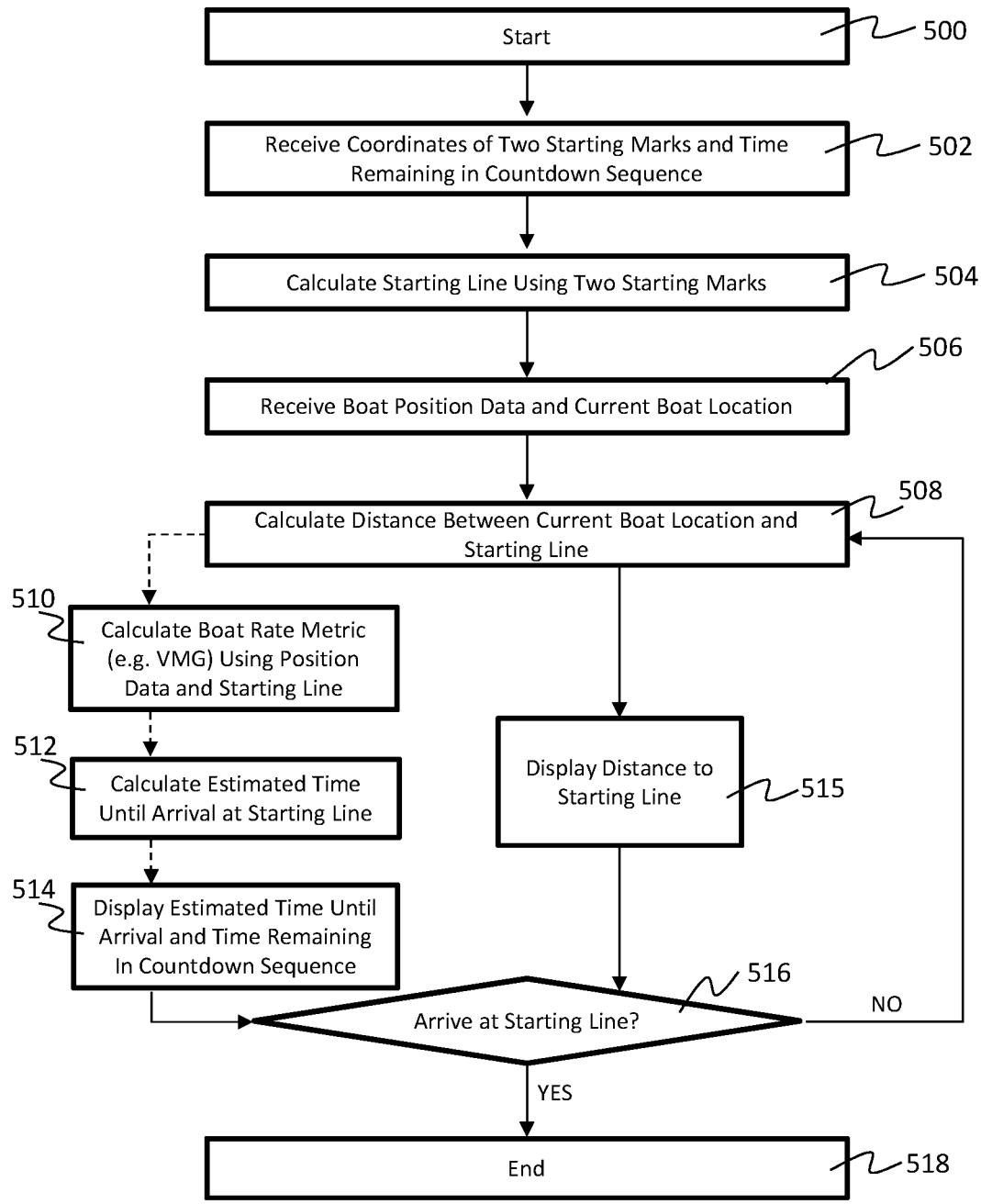
FIG. 14 is a flowchart of a method for providing an aid to sailboats for the start of a sailboat race.

Referring to FIG. 14, a method is shown demonstrating a display feature for use with the race tracking system 10 as shown in FIG. 1. The method starts 500 and the system receives coordinates of two starting marks and the time remaining in the countdown sequence 502. The system calculates the starting line using the two starting marks 504. The system receives the boat position data and current boat location data 506. The system calculates the distance between the current boat location and starting line 508. Steps 510-514 are an optional part of the system, where the system calculates a boat rate metric (e.g. velocity made good or VMG) using position data and the starting line 510; the system calculates estimated time until arrival at starting line 512; and the system displays estimated time until arrival and time remaining in countdown sequence 514. The system displays distance to starting line 515. The system determines if the boat has arrived at the starting line 516. If the boat has not arrived at the starting line, the system continues to calculate the distance between current boat location and the starting line 508. If the boat has arrived at the starting line the method ends 518.

The sailboat race tracking system 10 offers several advantages over known devices and system. The data selected by a sailor for display on the smartphone screen replaces expensive and complicated wired and wireless instruments requiring professional installation, replacement batteries, through-holes in the hull, poor screen visibility, and the like. Most people charge their smartphones each evening and take them wherever they go as a matter of habit. Clipping it to a mount on the sailboat for this purpose will improve overall availability and reliability of sailboat racing instruments, and it will make it easier for event organizers to manage and promote their sailboat racing events. The sailboat race tracking system allows sailboat position data to be crowdsourced, time synced, and displayed in real time for spectators or in replay for participants of the sailboat race. In this aspect, sailboat racing event organizers use the same smartphone software to time mark the start of each race, or more preferably the start of the countdown sequence of each race. The time marks allow the crowdsourced racing sailboats' track data to be time synced, edited and/or combined into individual races and/or starts on an automated basis for spectators and/or participant replay. Current racing sailboat scoring systems do not provide any data about terminated races and/or countdown sequences.

Other advantages include use of the sailboat race tracking system 10 as a sailboat race starting aid. In this respect position data relating to the ends of the starting line can be used to calculate and display a course axis. The course axis is an imaginary line perpendicular to the line defined by the ends of the starting line. Skilled sailors can use the course axis together with their own wind readings, current observations, and the event organizers position of the race course marks to make a judgment about which end of the starting line is most favorable for the race. Similarly, the sailboat race tracking system 10 allows for calculation of the starting line using the starting marks, such that the system may compare the racing sailboats' instantaneous positions to the starting line in order to calculate a perpendicular distance to the starting line. A skilled sailor can use this distance displayed on the smartphone screen together with the time remaining in the countdown sequence to the start of the race and the racing sailboat's speed in an attempt to be sailing full speed exactly at the starting line precisely when the race starts. It will be understood, that the countdown timing to the start of the race can be provided by and displayed on the screen of the smartphone or can be provided by a separate timing watch on the racing sailboat. If provided by the smartphone, a sync function to reset the countdown sequence to the nearest minute so that an individual boat's timing perfectly matches the event organizer's timing is preferred.

Other advantages include that "pings" or crowdsourced entries for the position of the marks of the race course can be set by the event organizer to enhance spectating and/or replay of the racing sailboat's tracks. In addition, the event organizer can use its own starting line pings or a crowdsourced version thereof from the accumulated data of the racing sailboats in order to assess starting penalties, e.g. for individual racing sailboats that cross the starting line before the start time in accordance with the Racing Rules of Sailing. Similarly, the use of a detector can be incorporated to automatically detect when a boat crosses a starting plane. RFID tags or QR codes can be located on the boats such that the boats are automatically identified and associated with their precise time of crossing the starting plane. This can be used as a tool to help an event organizer determine start penalties, or it can be used as part of an automated system such that racing sailboats are notified individually or as a group when one or more of them has crossed the starting line prior to the start in contravention to the Rules. Such notifications can be displayed on the software-equipped smartphones of the racing sailboats.

While several embodiments have been disclosed, it will be apparent to those of ordinary skill in the art having the benefit of the present disclosure that aspects of the present disclosure include many more embodiments and implementations. Accordingly, aspects of the present disclosure are not to be restricted except in light of the attached claims and their equivalents. It will also be apparent to those of ordinary skill in the art having the benefit of the present disclosure that variations and modifications can be made without departing from the true scope of the present disclosure. For example, in some instances, one or more features disclosed in connection with one embodiment can be used alone or in combination with one or more features of one or more other embodiments.

What is claimed is:

1. A sailboat race tracking system comprising:
an event organizer computing device accessible via a telecommunication network at least a portion of which is wireless, the event organizer computing device providing starting mark position data of the race;
a plurality of sailboat computing devices each mounted on a respective sailboat and authenticated to said event organizer computing device via sailboat identification and via event race registration;
said event organizer computing device being configured for setting a time indicative of a race start for the race;
said event organizer computing device transmitting the race start time and the starting mark position data to the plurality of sailboat computing devices;
one of the sailboat computing devices calculating a position of the starting line of the race and a time until the respective sailboat crosses the starting line; and
the one of the sailboat computing devices displaying a time remaining until the race start time and the time until the sailboat crosses the starting line.

2. The sailboat race tracking system of claim 1, wherein the starting system transmitted by said event organizer computing device comprises signals indicative of a starting sequence of the race.

3. The sailboat race tracking system of claim 2, wherein the signals comprise a virtual flag indicative of a stage of the starting sequence.

4. The sailboat race tracking system of claim 1, wherein said event organizer computing device provides a countdown sequence for time remaining before the race start to the plurality of sailboat computing devices.

5. The sailboat race tracking system of claim 1, wherein the starting mark position data transmitted by said event organizer computing device comprises a starting line, which is determined based on the starting mark position.

6. The sailboat race tracking system of claim 5, wherein said event organizer computing device transmits a rate metric to each sailboat computing device, the rate metric being calculated using the position data transmitted by the respective sailboat computing device and indicative of a rate of progress to the starting line.

7. The sailboat race tracking system of claim 6, wherein the rate metric includes a distance to the starting line.

8. The sailboat race tracking system of claim 6, wherein said event organizer computing device transmits an estimated time until arrival at the starting line to each sailboat computing device, the estimated time until arrival being calculated using the rate metric.

9. The sailboat race tracking system of claim 5, wherein said event organizer computing device transmits a starting system, wherein said event organizer computing device transmits an indication when any individual one of a plurality of racing sailboats is over the starting line before the race start time and/or in contravention of the starting system.

10. The sailboat race tracking system of claim 9, wherein said event organizer computing device:
determines a race start penalty for the individual one of the plurality of racing sailboats that is over the starting line before the race start time and/or in contravention of the starting system; and
transmits the race start penalty to the sailboat computing device associated with the individual one of the plurality of racing sailboats.

11. The sailboat race tracking system of claim 10, wherein said event organizer computing device indicates when the individual one of the plurality of racing sailboats has successfully restarted the race to exonerate itself of the contravention.

12. The sailboat race tracking system of claim 5, wherein said event organizer computing device or a race computer determines the starting line based on the starting mark position and a second starting mark position.

13. The sailboat race tracking system of claim 12, further comprising another event organizer computing device which provides the second starting mark position.

14. The sailboat race tracking system of claim 1, wherein a position satellite transmits the starting mark position to said event organizer computing device.

15. The sailboat race tracking system of claim 1, wherein one of the plurality of sailboat computing devices serves as said event organizer computing device.

16. The sailboat race tracking system of claim 5, wherein said event organizer computing device uses the starting line to calculate a course axis and transmits the course axis to the plurality of sailboat computing devices.

17. The sailboat race tracking system of claim 1, further comprising a race computer that receives the race start time, the starting system, and the starting mark position data from said event organizer computing device, the race computer being accessible by a spectator computing device for displaying the race start time, the starting system, and/or the starting mark position data.

* * * * *